W. R. TWIFORD.
WINDMILL.
APPLICATION FILED OCT. 13, 1919.

1,384,787.

Patented July 19, 1921.
4 SHEETS—SHEET 1.

Witnesses
R. A. Thomas

Inventor
W. R. Twiford
By Victor J. Evans
Attorney

W. R. TWIFORD.
WINDMILL.
APPLICATION FILED OCT. 13, 1919.

1,384,787.

Patented July 19, 1921.
4 SHEETS—SHEET 2.

Witnesses
R. A. Thomas.

Inventor
W. R. Twiford

By Victor J. Evans
Attorney

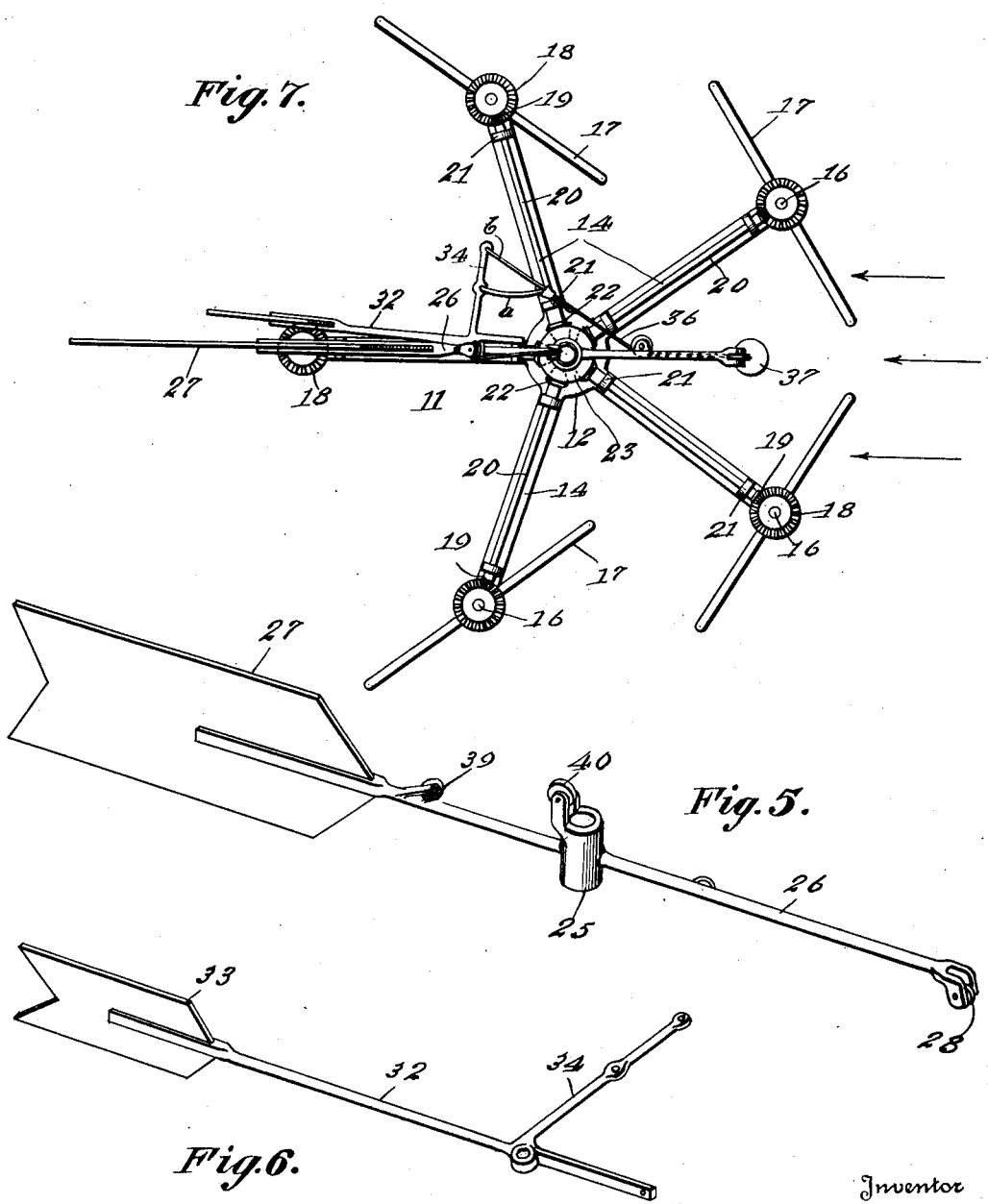

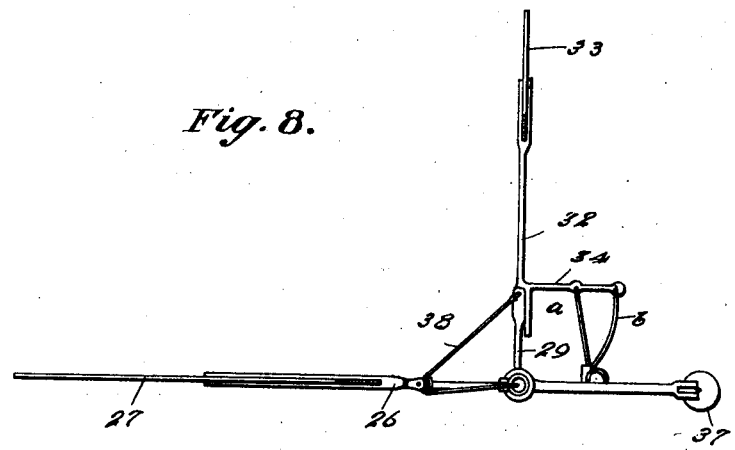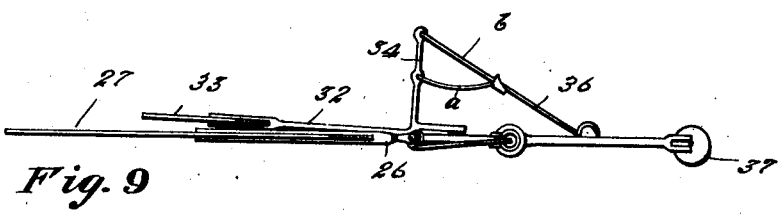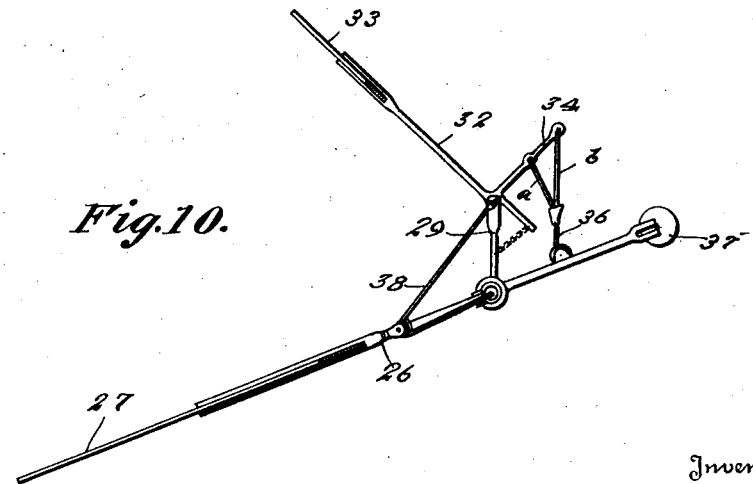

UNITED STATES PATENT OFFICE.

WILLIAM R. TWIFORD, OF MANVILLE, WYOMING.

WINDMILL.

1,384,787.   Specification of Letters Patent.   Patented July 19, 1921.

Application filed October 13, 1919. Serial No. 330,217.

*To all whom it may concern:*

Be it known that I, WILLIAM R. TWIFORD, a citizen of the United States, residing at Manville, in the county of Niobrara and State of Wyoming, have invented new and useful Improvements in Windmills, of which the following is a specification.

This invention relates to windmills and aims to provide a mill in which the fan is rotatable horizontally upon a vertically disposed shaft.

An object of the invention is to provide a fan of this description which includes a frame, in which is rotatably mounted a plurality of fan blades geared in a manner to cause them to automatically assume the proper position to catch the wind and after move from such position to automatically assume a position in the rotation of the fan as to offer no resistance to the wind, the fans operating successively in this manner.

Another object is to provide a fan of this character with the usual vane for keeping the fan in proper position for action by the wind.

A further object is to include a governing means consisting of a vane normally disposed at right angles to the main vane, the connection being such as to automatically govern the speed of the fan or to so dispose the fan blades with respect to the main vane that the wind will not act upon the fan.

With the above and other objects in view, the invention consists of the following novel combination and arrangement of parts, hereinafted more fully described and illustrated in the accompanying drawings, in which—

Fig. 5 is a detail perspective view of the main vane detached;

Fig. 6 is a similar view of the governing vane and its associated parts detached from the mill; and Fig. 7 is a plan view of the fan showing the blades and vanes in an inoperative position.

Fig. 8 is a view in diagram illustrating the position of the vanes and arms when the mill is in operation, the arrow indicating the direction of the wind.

Fig. 9 is a similar view showing the position of the parts when the mill is shut off.

Fig. 10 is a like view showing the position of the main vane when the latter has been swung around somewhat out of line with the wind and the position of the small or governing vane at this time.

Figure 1:
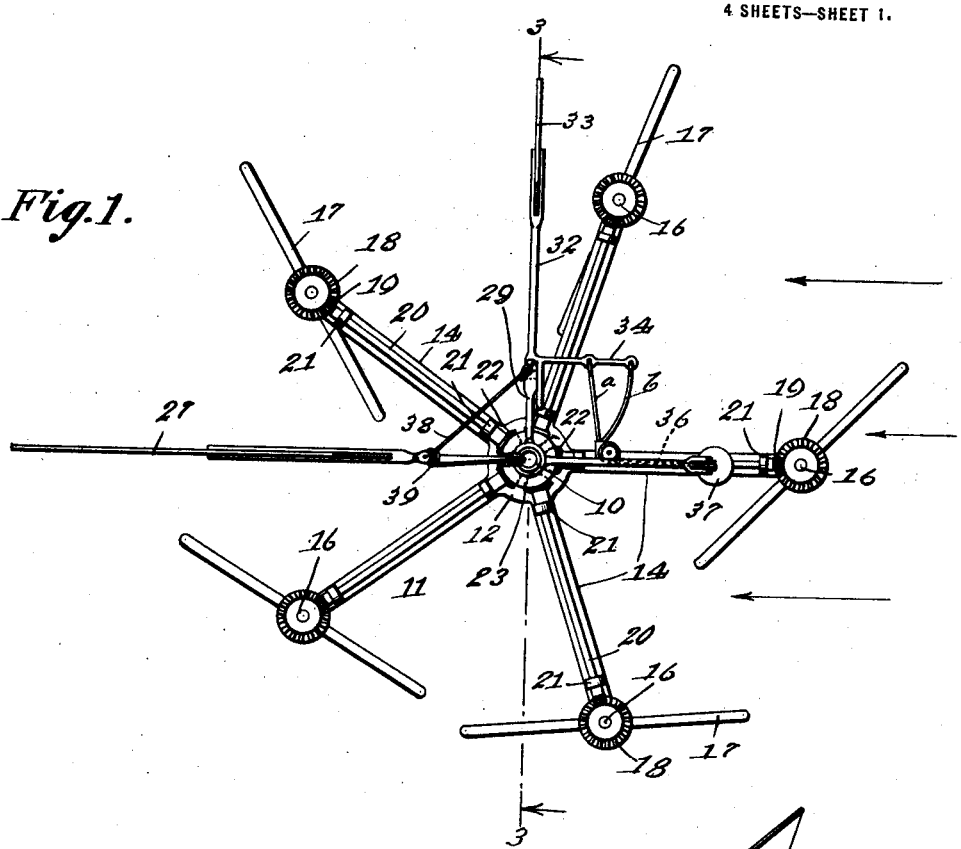
Figure 1 is a plan view of a windmill embodying the present invention.
Figure 4:
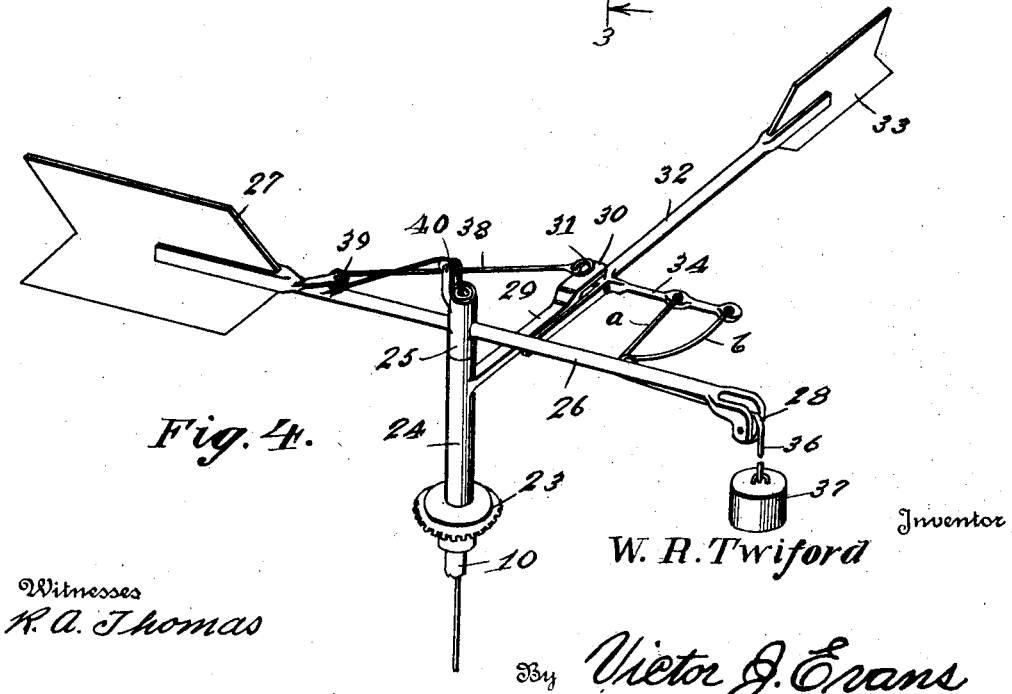
Fig. 4 is an enlarged perspective view of the main and governing vanes and their associated parts assembled.
Figure 2:
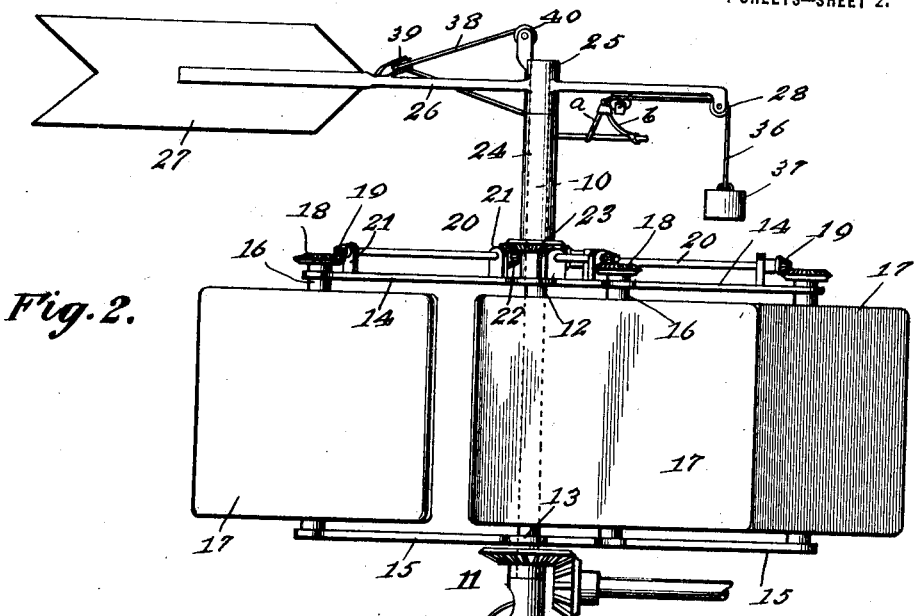
Fig. 2 is a side elevation of the same.
Figure 3:
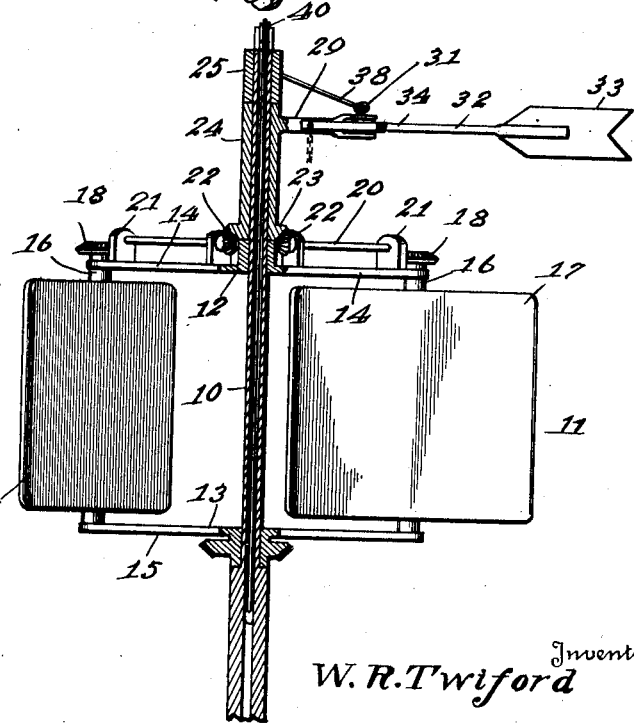
Fig. 3 is a central vertical sectional view.

Referring in detail to the drawings wherein like characters of reference denote corresponding parts, the mill includes a main shaft 10, which may be secured in any suitable manner upon a tower of any construction, the tower forming no part of the present invention.

Mounted to rotate upon the shaft 10 is a frame designated in its entirety by the reference character 11, the said frame including upper and lower parallel members 12 and 13 respectively, suitably spaced apart. These members each comprise radially disposed arms 14 and 15, the arms 14 of the upper member and the arms 15 of the lower member being connected at their outer ends by means of a shaft 16, mounted in suitable bearings.

Secured to each of the shafts 16 is a fan blade 17, there being preferably five of such blades and consequently five pairs of radially disposed arms.

Secured to the upper end of each of the shafts 16 is a bevel gear 18 and meshing with each of these gears is a bevel pinion 19, the said pinion being secured upon one end of a horizontally disposed shaft 20, mounted in bearings 21 secured to the arm 14 of the upper member 12. Secured to the opposite end of the shaft 20 is a bevel pinion 22, the said pinion being adapted to engage a bevel gear 23 mounted for rotation upon the main shaft 10. The ratio of gearing connecting the blades 17 with the gear 23 is two to one, or such ratio as will cause the blades 17 to make one-half revolution upon the shaft 16 to one revolution of the fan. By this means certain of the blades will always present a working surface to the direction of travel of the wind, the remaining fans being so positioned as to offer the least possible resistance to the wind until the fan has revolved sufficiently to enable the blades to assume a proper working position. This action is automatic as the rotation of the fan causes the rotation of the blades independently thereof.

In order to keep the fan properly disposed with respect to the direction of the wind and to hold the fan blades at a proper angle, there is provided a main vane and a governing vane, both of said vanes being mounted upon the main shaft 10, so that they may be rotated around said shaft in a manner to change the position of each of the blades 17, to hold them in proper position for action by the wind, the mill having a tendency to throw the large vane around against the wind and to swing the large vane somewhat out of line. This is accomplished by securing to the bevel gear 23 a sleeve 24, which is adapted to be positioned upon the shaft 10 so as to be rotated with said gear. This sleeve 24 extends only a part of the way up the shaft 10 and also mounted upon this shaft and abutting the upper end of the sleeve 24 is a sleeve 25. This latter sleeve carries an arm 26, upon one end of which is secured the main vane 27, the opposite end of this arm carrying a roller or pulley 28.

Secured upon the upper end of the sleeve 24 is an arm 29, the outer end of which is bifurcated as shown at 30. Pivoted within this bifurcated end upon pivot bolts 31 is an arm 32, the outer end of which supports the governing vane 33, while the inner end extends slightly beyond the pivot bolt 31 so as to engage upon one side of the arm 29 to limit the pivotal movement of the said vane in the direction of the pulley 28. Secured to the arm 32 and extending radially from the pivot point through which the bolt 31 passes is an arm 34. The length of the arm 34 is less than the distance between the sleeve 24 and the pulley 28 and to provide sufficient leverage for the governing vane to act readily in pulling the mill end gear, there are secured to the arm two cables $a$ and $b$ which have one of their ends secured to a cable 36 passing over the pulley 28, the latter being carried by the arm 26. The opposite end of the cable 36 carries a weight 37. When the mill is in operation, the cable $b$ is slack and when the mill is shut off the cable $b$ is tight and the cable $a$ is slack. This reverses the leverage as needed by the small vane and the weight.

Secured to the arm 32 at the pivot point through which the bolt 31 passes, is one end of a cable 38, the said cable passing over a pulley 39 secured to the inner end of the vane 27. This cable also passes over a pulley 40 mounted upon the upper end of the shaft 10, the said shaft being hollow so that the cable 38 may pass downward through this shaft in a convenient place in operation.

When the parts are in the position shown in Fig. 1, the main vane and governing vane are both in proper position to dispose the blades 17 in proper position for action by the wind, the said wind being in the direction of the arrow. Upon the rotation of the fan the blades will automatically rotate upon their respective shafts, due to the vanes holding the gear 33 practically stationary.

As the size of the vane 33 is considerably less than that of the main vane 27, the action of a wind of ordinary velocity has practically no effect upon the first mentioned vane. As the wind increases above the normal, however, the vane 33 is moved upon its pivot toward the vane 27, rotating the gear 23 in proportion to such movement and changing the relative position of each of the blades 17, so that the full force of the wind will not act upon these blades. The small or governing vane acts to hold the blades at a proper angle for action by the wind, the tendency being to hold the mill in gear to the point of lifting the weight. When it is desired to cut off the operation of the fan the cable 38 is operated to draw the vane 33 around into position against the vane 27, this action resulting in the sufficient rotation of the gear 23 to move the blades 17 to the position shown in Fig. 7, so that the wind will not act upon the blades to rotate the fan. Upon releasing the cable 36, the weight 27 will cause the vane 33 to assume a position at right angles to the vane 27 and through the gear 23 move the blades 17 into position where they may be again acted upon by the wind.

Various changes may be made in the form, proportion and minor details of construction, for example, the outer ends of the arms 15 may be supported upon a suitable track in fans of large diameter, or the number of such arms may be varied to suit the conditions.

Having described the invention, what is claimed is:

1. A wind mill embodying a fan having rotatably mounted fan blades, a main governing vane, a supplemental governing vane, said supplemental governing vane being geared to the fan blades and mounted for horizontal pivotal movement and including an L-shaped arm positioned upon one side of the pivot, a weighted cable connecting the vanes and means connecting the L-shaped arm and cable for controlling the position of the supplemental vane.

2. A wind mill embodying a fan having rotatably mounted fan blades, a main governing vane, a supplemental governing vane, said last mentioned vane being geared to the blades and mounted for horizontal pivotal movement and including an L-shaped arm positioned upon one side of the pivot, a weighted cable connecting the vanes and a pair of flexible elements having one of their ends secured to the L-shaped arm in spaced relation and their opposite ends connected to the weighted cable at substantially the same point for controlling the position of the supplemental vane.

In testimony whereof I affix my signature.

WILLIAM R. TWIFORD.